(12) United States Patent
Enomoto et al.

(10) Patent No.: US 6,282,484 B1
(45) Date of Patent: Aug. 28, 2001

(54) CRUISE CONTROL APPARATUS

(75) Inventors: Keiichi Enomoto; Eisaku Hori, both of Kanagawa-ken; Satoru Hasegawa, Tokyo, all of (JP)

(73) Assignees: Fuji Jukogyo Kabushiki Kaisha, Tokyo; Jidosha Denki Kogyo Kabushiki Kaisha, Yokohama, both of (JP)

( * ) Notice: Subject to any disclaimer, the term of this patent is extended or adjusted under 35 U.S.C. 154(b) by 0 days.

(21) Appl. No.: 09/602,674

(22) Filed: Jun. 26, 2000

(30) Foreign Application Priority Data

Jun. 29, 1999 (JP) .................................................. 11-183995

(51) Int. Cl.[7] ....................................................... B60T 7/12
(52) U.S. Cl. ................................. 701/97; 701/92; 701/93; 701/91
(58) Field of Search ................................... 701/91, 92, 93, 701/110, 97, 95; 340/903, 436, 407; 180/178, 179, 170, 171, 180, 189; 123/339.12, 531, 339.14, 339.18

(56) References Cited

U.S. PATENT DOCUMENTS

| | | | |
|---|---|---|---|
| 5,031,715 | * | 7/1991 | Ogawa et al. ........................ 180/179 |
| 5,547,037 | * | 8/1996 | Torii ..................................... 180/178 |
| 6,178,372 | * | 2/2001 | Tabata et al. .......................... 701/97 |

* cited by examiner

Primary Examiner—William A. Cuchlinski, Jr.
Assistant Examiner—Marthe Y. Marc-Coleman
(74) Attorney, Agent, or Firm—Martin A. Farber

(57) ABSTRACT

There is provided a cruise control apparatus whose reliability can be improved by protecting the actuator from failing. A cruise control apparatus with a controller ECU capable of canceling the cruise control when the temperature data given by the actuator temperature estimation unit exceeds a predetermined value.

7 Claims, 5 Drawing Sheets

CRUISE CONTROL APPARATUS

BACKGROUND OF THE INVENTION

1. Field of the Invention

The present invention relates to a cruise control apparatus for automatically controlling the running speed of a car to a set value.

2. Description of the Related Art

In the cruise control apparatus that automatically controls the traveling speed of a car to a specified value, the turning on of a command switch causes the car speed at the turn-on operation to be stored in a controller and, depending on a difference between a memory car speed and an actual car speed, a cruise command signal is given to a motor-driven actuator, which in turn drives a throttle valve to execute a cruise control to match the actual car speed to the memory car speed. As a result, the car cruises at a constant speed.

The cruise control apparatus described above, however, has a problem that when the command switch is used frequently or when the cruise control is performed while the car is traveling on a road with long, continuous up and down slopes, the frequency of the actuator increases, raising the temperature of the actuator.

SUMMARY OF THE INVENTION

It is an object of the present invention to provide a cruise control apparatus that can prevent an increase in the actuator temperature to improve the reliability of the actuator.

The cruise control apparatus according to a first aspect of the invention comprises an actuator to open and close a throttle valve; a controller to drive and control the actuator; and an actuator temperature estimation means to estimate an ambient temperature of the actuator based on a frequency of operation of the actuator; wherein the controller cancels a cruise control when temperature data given by the actuator temperature estimation means exceeds a predetermined value.

The cruise control apparatus according to a second aspect of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; a temperature check means to check whether temperature data given by the actuator temperature estimation means is in excess of a predetermined value and, when it decides that the temperature data is in excess of the predetermined value, generate an output signal; and a cancel means to apply to the control unit a cancel command signal for stopping the cruising while it is supplied with the output signal from the temperature check means.

The cruise control apparatus according to a third aspect of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; and a temperature check means to check whether temperature data given by the actuator temperature estimation means is in excess of a predetermined value and, when it decides that the temperature data is in excess of the predetermined value, generate an output signal; wherein the control unit disables the acceptance of the cruise command signal from the command switch while the temperature check means is generating the output signal.

The cruise control apparatus according to a fourth aspect of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; a temperature check means to check whether temperature data given by the actuator temperature estimation means is in excess of a predetermined value and, when it decides that the temperature data from the actuator temperature estimation means is in excess of a first value, generate an output signal and continue to generate the output signal until the temperature data from the actuator temperature estimation means is below a predetermined second value, the second value being lower than the first value; and a cancel means to generate a cancel command signal for stopping the cruising while it is supplied with the output signal from the temperature check means.

The cruise control apparatus according to a fifth aspect of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; and a temperature check means to check whether temperature data given by the actuator temperature estimation means is in excess of a predetermined value and, when it decides that the temperature data from the actuator temperature estimation means is in excess of a first value, generate an output signal and continue to hold the output signal until the temperature data from the actuator temperature estimation means is below a predetermined second value, the second value being lower than the first value; wherein the control unit disables the acceptance of the cruise command signal from the command switch while the temperature check means is generating the output signal.

The cruise control apparatus according to a sixth of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; and a temperature check means to check whether temperature data given by the actuator temperature estimation means is in excess of a predetermined value; and a cancel means to generate an output signal when the temperature check means decides that the temperature data from the actuator temperature estimation means is in excess of a predetermined first value, and to apply a cancel command signal to the control unit while the cancel means is supplied with the output signal from the temperature check means until the temperature data from the actuator temperature estimation means is below a predetermined second value, the second value being lower than the first value; wherein the control unit disables the acceptance of the cruise command signal from the command switch while the temperature check means is generating the output signal.

The cruise control apparatus according to a seventh aspect of the invention comprises a command switch operated to generate a cruise command signal for performing cruising; a controller having a control unit to give an actuator a drive signal for cruising at a constant speed upon receiving the cruise command signal generated by the command switch; an actuator to control the opening and closing of a throttle valve of an engine according to the drive signal from the controller; an actuator temperature estimation means to estimate an ambient temperature of the actuator based on a frequency of operation of the actuator; a temperature check means to check whether temperature data given by the actuator temperature estimation means is in excess of a predetermined value and, when it decides that the temperature data from the actuator temperature estimation means is in excess of the predetermined value, generate an output signal; a cancel means to apply to the control unit a first cancel command signal for stopping the cruising while it is supplied with the output signal from the temperature check means; and a cancel hold means to generate a second cancel command signal for a predetermined time interval when the cancel means generates the first cancel command signal.

In the cruise control apparatus according to the first aspect of the invention, when the temperature data from the actuator temperature estimation means exceeds the predetermined value, the controller cancels the cruise control. Because the actuator is not used for the cruise control when its temperature becomes high, its temperature rise can be suppressed.

In the cruise control apparatus according to the second aspect of the invention, when the temperature check means decides that the temperature data from the actuator temperature estimation means is in excess of the predetermined value, the cancel means applies a cancel command signal to the control unit to stop the cruising. When the temperature of the actuator becomes high, the cancel means cancels the cruising, stopping the operation of the actuator. This suppresses the actuator temperature rise.

In the cruise control apparatus according to the third aspect of the invention, when the temperature check means decides that the temperature data from the actuator temperature estimation means is in excess of the predetermined temperature data, the control unit does not accept the cruise command signal from the command switch. Because the input from the command switch is not accepted when the actuator temperature becomes high, the cruising is stopped and the actuator is not operated, thus limiting an actuator temperature rise.

In the cruise control apparatus according to the fourth aspect of the invention, when the temperature check means decides that the temperature data from the actuator temperature estimation means is in excess of the predetermined first value, the cancel means applies to the control unit a cancel command signal for stopping the cruising until the temperature data from the actuator temperature estimation means goes below the predetermined second value. Because the cruising is canceled by the cancel means until the actuator temperature goes below the predetermined temperature, the actuator temperature rise can be suppressed.

In the cruise control apparatus according to the fifth aspect of the invention, when the temperature check means decides that the temperature data from the actuator temperature estimation means is in excess of the predetermined first value, the control unit does not accept the cruise command signal from the command switch until the temperature data from the actuator temperature estimation means goes below the predetermined second value. Because the command switch input is not accepted until the actuator temperature is below the predetermined temperature, the cruising is not performed and the actuator is not operated, and the actuator temperature rise can be suppressed.

In the cruise control apparatus according to the sixth aspect of the invention, when the temperature check means decides that the temperature data from the actuator temperature estimation means is in excess of the predetermined first value, the cancel means applies the cancel command signal to the control unit until the temperature data from the actuator temperature estimation means goes below the predetermined second value. When the temperature check means decides that the temperature data from the actuator temperature estimation means is in excess of the predetermined first value, the control unit does not accept the cruise command signal from the command switch until the temperature data from the actuator temperature estimation means goes below the predetermined second value. Because the cruising is canceled and the command switch is not accepted until the actuator temperature goes below the predetermined temperature, the cruising control is stopped and the actuator is not operated. This suppresses the actuator temperature rise.

In the cruise control apparatus according to the seventh aspect of the invention, when there is an output signal from the temperature check means, the cancel means applies to the control unit the first cancel command signal for stopping the cruising. When there is the first cancel command signal from the cancel means, the cancel hold means generates the second cancel command signal for a predetermined time interval. Because when the actuator temperature increases, the cruising is canceled by the cancel means and the cancel hold means, the cruising is stopped and the actuator is not operated. This suppresses the actuator temperature rise.

DESCRIPTION OF THE PREFERRED EMBODIMENTS

Figure 1:
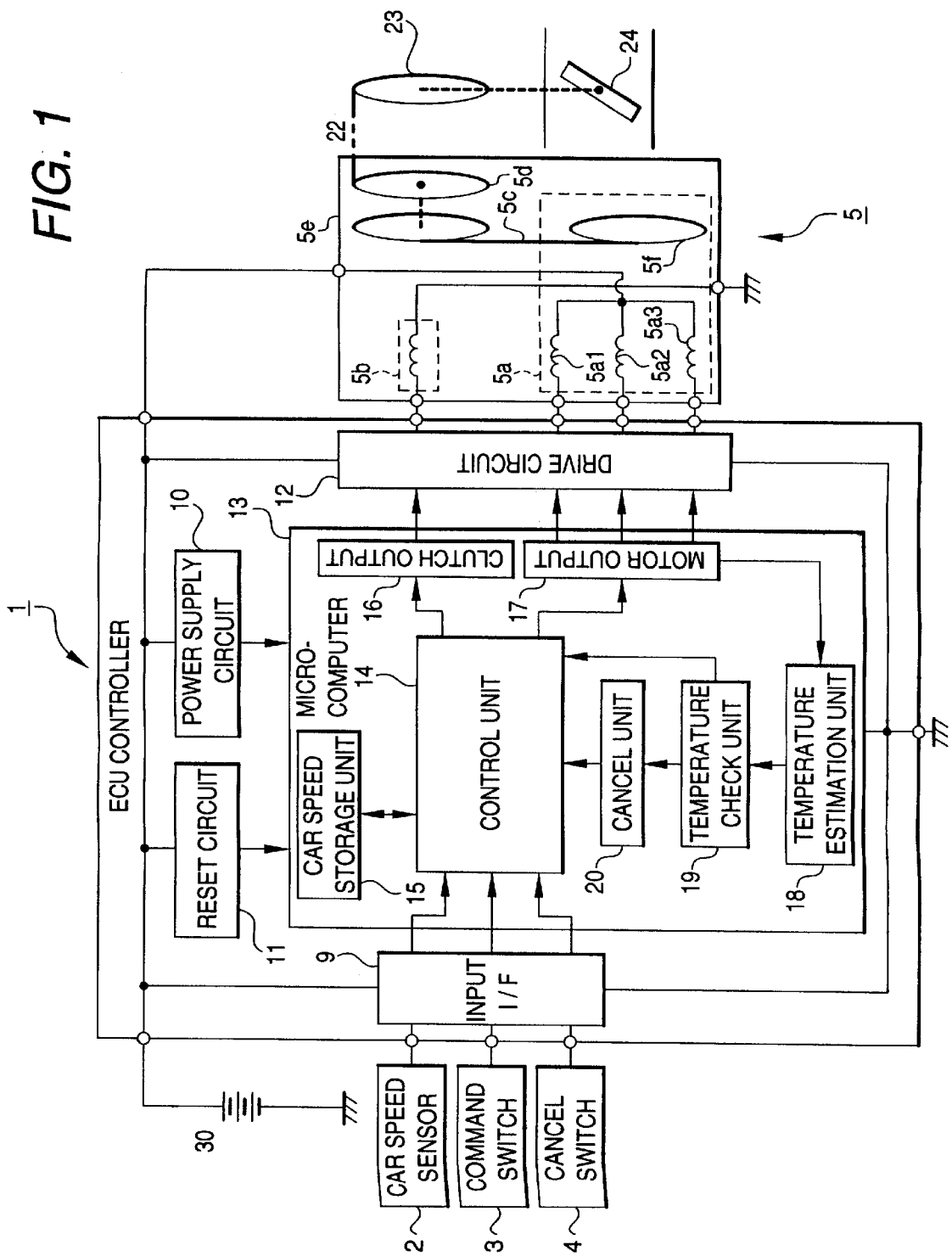
FIG. 1 is a block configuration diagram of the first embodiment of the cruise control apparatus according to the present invention.

FIGS. 1 to 4 show a first embodiment of the cruise control apparatus according to the present invention.

The cruise control apparatus 1 shown comprises mainly a car speed sensor 2, a command switch 3, a cancel switch 4, an actuator 5, and a controller ECU.

The controller ECU has an input interface 9, a power supply circuit 10, a reset circuit 11, and a microcomputer 13.

The microcomputer 13 incorporates a control unit 14, a car speed storage unit 15, a clutch output unit (clutch output) 16, a motor output unit (motor output) 17, a temperature estimation unit (actuator temperature estimation unit) 18, a temperature check unit 19, and a cancel unit 20.

The car speed sensor 2 is built into the speed meter and, while the car is traveling, generates speed data proportional to the actual speed of the car in the form of a pulse signal. The car speed data generated by the car speed sensor 2 is given to the control unit 14 through the input interface 9 of the controller ECU.

The command switch 3 is of an automatic reset type and attached to a steering wheel. With the cruise control canceled, the command switch 3, when turned on, generates a cruise command signal, which is given to the control unit 14 through the input interface 9 of the controller ECU.

The cancel switch 4, like the command switch 3, is an automatic reset type switch attached to the steering wheel. The cancel switch 4, when turned on during the cruise control, generates a cancel command signal, which is then sent to the control unit 14 through the input interface 9 of the controller ECU. The cancel command signal is also generated when a brake switch is operated by the depression of a brake pedal not shown or when an automatic transmission not shown is changed from a neutral range to a parking range, or when a clutch pedal of a manual transmission not shown is operated.

The actuator 5 has a step motor $5a$, a clutch $5b$, a reduction gear $5c$ and an output pulley $5d$, all accommodated in an actuator case $5e$.

The step motor $5a$ has a first-phase stator coil $5a1$, a second-phase stator coil $5a2$ and a third-phase stator coil $5a3$. The first-, second- and third-phase stator coils $5a1$, $5a2$, $5a3$ are electrically connected to a drive circuit 12 of the controller ECU. The clutch $5b$ is electrically connected to the drive circuit 12 of the controller ECU.

The step motor $5a$ has a rotor $5f$ coupled to an input stage of the reduction gear $5c$. An output stage of the reduction gear $5c$ is coupled through the clutch $5b$ to the output pulley $5d$ which in turn is connected to a throttle wire 22. The throttle wire 22 is then connected to a throttle valve 24 of the engine through a throttle link 23.

The rotor $5f$ of the step motor $5a$ is rotated by exciting currents applied from the drive circuit 12 to the first-, second- and third-phase stator coils $5a1$, $5a2$, $5a3$. The rotation of the rotor $5f$ causes the output pulley $5d$, through the reduction gear $5c$, to turn a predetermined angle to pull or return the throttle wire 22 to change the opening of the throttle valve 24. At this time, if the clutch output unit 16 applies a clutch-on signal to the drive circuit 12, the clutch $5b$ is engaged to transmit the power of the output stage of the reduction gear $5c$ to the output pulley $5d$. On the other hand if the clutch output unit 16 does not apply the clutch-on signal to the drive circuit 12, the clutch $5b$ is disengaged, preventing the power of the output stage of the reduction gear $5c$ from being transmitted to the output pulley $5d$, so that the throttle valve 24 is automatically returned by a return spring.

The power supply circuit 10 is electrically connected to a power source 30 and, when an ignition switch not shown is turned on, applies a predetermined voltage to the microcomputer 13.

The reset circuit 11 is electrically connected to the power source 30 and, when the ignition switch not shown is turned on, resets the microcomputer 13 to an initialized state.

The drive circuit 12 is constructed of relays and switching transistors, and includes a clutch drive unit, a first-phase stator coil drive unit, a second-phase stator coil drive unit and a third-phase stator coil drive unit.

When the drive circuit 12 is given a clutch-on signal from the clutch output unit 16 in the microcomputer 13, the clutch drive unit of the drive circuit 12 is turned on to engage the clutch $5b$ of the actuator 5.

When the clutch-on signal is not applied from the clutch output unit 16 in the microcomputer 13 to the drive circuit 12, the clutch drive unit is not turned on, so that the clutch $5b$ of the actuator 5 is disengaged.

When a motor drive signal is given from the motor output unit 17 in the microcomputer 13, the drive circuit 12 applies exciting currents from its first-, second- and third-phase stator coil drive units to the first-, second- and third-phase stator coils $5a1$, $5a2$, $5a3$ of the step motor $5a$ to rotate the rotor $5f$.

When a cruise command signal is generated by the turn-on operation of the command switch 3 while the car is traveling, the car speed storage unit 15 stores in a predetermined memory area in the control unit 14 the car speed signal from the car speed sensor 2 as memory car speed data.

The clutch output unit 16 converts the clutch on-command signal given by the control unit 14 into a clutch-on signal and sends it to the clutch drive unit of the drive circuit 12.

The motor output unit 17 converts a motor drive command signal given by the control unit 14 into a first output signal (output 1 in a flow chart), a second output signal (output 2 in the flow chart) and a third output signal (output 3 in the flow chart) and applies them to the first-, second- and third-phase stator coil drive units of the drive circuit 12.

The temperature estimation unit 18 calculates estimated coil temperatures T1 of the first-, second- and third-phase stator coils $5a1$, $5a2$, $5a3$ according to the operation frequency of the first-, second- and third-phase stator coil drive units of the motor output unit 17.

For the temperature estimation unit 18 to calculate the estimated coil temperatures T1 of the first-, second- and third-phase stator coils $5a1$, $5a2$, $5a3$, the following first to tenth procedures are executed.

In a first procedure, an ambient temperature Tair outside the actuator case $5e$ is set to a predetermined value beforehand. It is also possible to measure a surrounding temperature including the ambient temperature Tair with an appropriate measuring device to determine the Tair.

In a second procedure, the estimated coil temperatures T1 of the first-, second- and third-phase stator coils $5a1$, $5a2$, $5a3$ are set to an initial value T0 calculated based on the ambient temperature Tair.

In a third procedure, the voltage V of the power source 30 is set to a predetermined constant value. It is also possible to measure the voltage V of the power source 30 with an appropriate measuring device and use the measured value.

In a fourth procedure, resistances R of the first-, second- and third-phase stator coils $5a1$, $5a2$, $5a3$ are calculated by using the estimated coil temperatures T1 and the following equation:

$$R = R0 \times (T1+A)/B$$

wherein R0 is a resistance at a certain temperature Tx and represents a coil resistance reference value.

Constants A and B are those calculated beforehand from a temperature characteristic of resistance of copper used as the material of the motor coil. They can be obtained by substituting t1=T1, t2=Tx, R(t1)=R(T1)=R and T(t2)=R(Tx)=R0 into the following known equation:

$$R(t1)=R(t2)\times(t1+234.5)/(t2+234.5)$$

In a fifth procedure, the amounts of heat Q generated by the first-, second- and third-phase stator coils $5a1$, $5a2$, $5a3$ are initialized to Q=0.

In a sixth procedure, measurements are made of the time CNT1, CNT2, CNT3 that elapse from the application of current to the first-, second- and third-phase stator coils $5a1$, $5a2$, $5a3$. For the measurement of the time, three counters are used to match the number of the stator coils of the step motor $5a$. In more specific terms, a first counter CNT1 is used to measure the time of current application to the first-phase stator coil $5a1$, a second counter CNT2 is used to measure the time of current application to the second-phase stator coil $5a2$, and a third counter CNT3 is used to measure the time of current application to the third-phase stator coil $5a3$.

In a seventh procedure, the sum I of currents supplied to the first-, second- and third-phase stator coils $5a1$, $5a2$, $5a3$ is estimated as a function of the times that have elapsed from the start of conduction CNT1, CNT2, CNT3, the resistance R and the voltage V of the power source 30. The currents I1, I2, I3 supplied to the first-, second- and third-phase stator coils $5a1$, $5a2$, $5a3$ are approximated by the following equations:

When the time CNT1 is CNT1<N:

$$I1=K\cdot CNT1$$

When the time CNT1 is CNT1>N:

$$I1=I0$$

Figure 2:
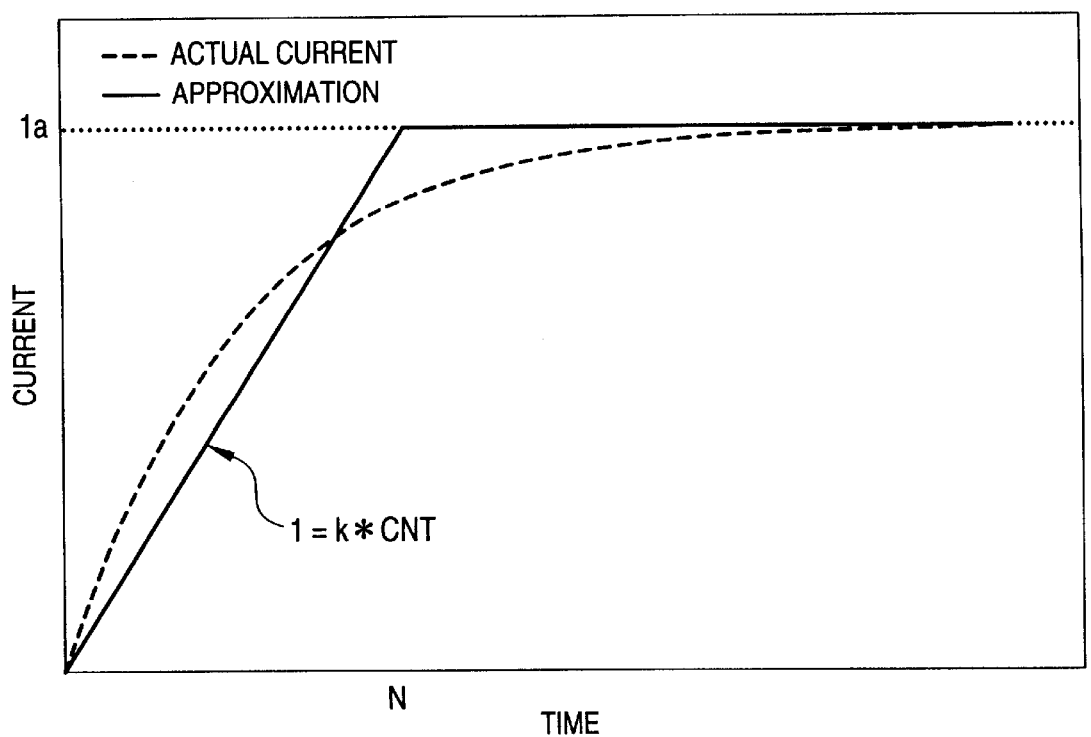
FIG. 2 is a characteristic diagram of current used for the control of the cruise control apparatus of FIG. 1.

At this time, the maximum current I0 is I0=V/R and the time constant N is N=I0/k where k is a current gradient which is calculated from inductance of the stator coils. The maximum current I0 has a characteristic for the actual current as shown in FIG. 2.

In an eighth procedure, a power consumption W of the step motor $5a$ is calculated from the current value I and the power supply voltage V according to the following equation:

$$W=V\times I$$

In a ninth procedure, the power consumption W is integrated to determine the generated heat Q of the first-, second- and third-phase stator coils $5a1$, $5a2$, $5a3$. In more concrete terms, for each unit time Δt, the following equation is used to calculate the generated heat:

$$Q=Q+W/\Delta t$$

In a tenth procedure, after the integration of the power consumption W, the coil temperatures T1 are calculated from the following recurrence equation:

$$T1=T1+F1a\ (T1, Tair)+Q/C$$

wherein F1a is a function representing a thermal transfer from the first-, second- and third-phase stator coils $5a1$, $5a2$, $5a3$ to the atmosphere, and C is heat capacities dQ/dT of the first-, second- and third-phase stator coils $5a1$, $5a2$, $5a3$ required to raise their temperatures by one degree.

An example of approximation of F1a is as follows:

$$F1a(T1, Tair)=K1a\times(Tair-T1)$$

wherein K1a is a constant.

From the above the coil temperature T1 can be estimated.

Further, when the first-, second- and third-phase stator coils $5a1$, $5a2$, $5a3$ are accommodated in a case, the temperature of an intermediate material between the atmosphere and the coil is taken to be a temperature T2 and the equation is changed so as to release heat through the intermediate material as described below to raise the estimation accuracy. At this time, it is necessary to initialize the temperature T2 of the intermediate material by the second step. The temperatures T1, T2 will be as follows:

$$T1=T1+F12\ (T1, T2)+Q/C\quad T2=T2+F21(T2, T1)+F2a\ (T2, Tair)$$

wherein F21 is a temperature variation of the intermediate material that is caused by heat moving from the intermediate material to the first-, second- and third-phase stator coils $5a1$, $5a2$, $5a3$, and F2a is a temperature variation of the intermediate material that is caused by heat moving from the intermediate material to the atmosphere.

Examples of approximation of F12, F21 and F2a are as follows:

$$F12\ (T2, T1)=K12\times(T2-T1)$$

$$F21\ (T1, T2)=K21\times(T1-T2)$$

$$F2a\ (Tair, T2)=K2a\times(Tair-T2)$$

wherein K12, K21 and K2a are constants. The temperature T2 may, for example, be a temperature within the case T2, as shown in the flow chart.

The temperature check unit 19 checks whether the coil temperature data obtained by the temperature estimation unit 18 is in excess of the predetermined first value (shown as a cancel temperature in the flow chart) and below the predetermined second value (shown as a recover temperature in the flow chart). When it is decided that the coil temperature data exceeds the first value, the temperature check unit 19 generates a cancel unit on-command signal. When the coil temperature data is found to be below the second value, the temperature check unit 19 cuts off the cancel unit on-command signal.

The cancel unit on-command signal generated by the temperature check unit 19 is used to turn on the cancel unit 20.

The cancel unit 20, when given the cancel unit on-command signal from the temperature check unit 19, is turned on to apply a cancel command signal (first cancel command signal) to the control unit 14.

When the command switch 3 is turned on while the car is traveling at a speed desired by the driver, the cruise command signal from the command switch 3 is taken into the control unit 14 through the input interface 9. The control unit 14 applies a clutch output unit on-command signal to the clutch output unit 16, which is turned on to apply a clutch on-signal to the drive circuit 12, which in turn engages the clutch $5b$ of the actuator 5.

Then, the control unit 14 turns on the motor output unit 17 by a cruise control initialize set signal calculated by a built-in computation unit. The motor output unit 17 then applies a motor drive signal to the drive circuit 12, which in turn applies exciting currents to the first-, second- and third-phase stator coils 5$a$1, 5$a$2, 5$a$3 of the step motor 5$a$ of the actuator 5 to rotate the rotor 5$f$ and therefore the output pulley 5$d$.

The control unit 14 compares the memory car speed data stored when the cruise command signal was generated and the actual car speed data given by the car speed sensor 2, and then performs a predetermined computation using a difference between the memory car speed data and the actual car speed data and an acceleration obtained from a rate of change of the car speed data within a predetermined period of time. When the result of computation is negative, the control unit 14 activates a speed increase unit for a duration corresponding to the computation result. Conversely, when the result of computation is positive, the control unit 14 activates a speed decrease unit for a duration corresponding to that computation result. These cruise controls match the actual car speed data given by the car speed sensor 2 to the memory car speed data stored in the car speed storage unit 15.

While the cruise control is performed, the estimated coil temperatures T1 of the first-, second- and third-phase stator coils 5$a$1, 5$a$2, 5$a$3 of the step motor 5$a$ are calculated successively. When the temperature check unit 19 decides that the coil temperature data estimated by the temperature estimation unit 18 are in excess of the predetermined first value, the cancel unit on-command signal is sent to the cancel unit 20, which in turn sends the cancel command signal to the control unit 14.

When the cancel command signal is received, the control unit 14 cuts off the clutch output unit on-command signal, at which time the clutch drive unit of the drive circuit 12 is turned off disengaging the clutch 5$b$ of the actuator 5, with the result that the opening adjustment of the throttle valve 24 is stopped, thus canceling the cruise control.

After the temperature check unit 19 has decided that the coil temperature data estimated by the temperature estimation unit 18 is in excess of the predetermined first value until it decides that the coil temperature data estimated by the temperature estimation unit 18 is below the predetermined second value, the cancel unit 20 is turned on to apply the cancel command signal to the control unit 14 to cancel the cruise control.

When the temperature check unit 19 decides that the coil temperature data estimated by the temperature estimation unit 18 is higher than the predetermined first value, the control unit 14 does not accept the input from the command switch 3. This check is made by the control unit 14 checking the presence or absence of the cancel flag FLAG.

After the temperature check unit 19 has decided that the coil temperature data estimated by the temperature estimation unit 18 is in excess of the predetermined first value until it decides that the coil temperature data estimated by the temperature estimation unit 18 is below the predetermined second value, the control unit 14 does not accept the input from the command switch 3. This check is made by the control unit 14 checking the presence or absence of the cancel flag FLAG.

Figure 3:
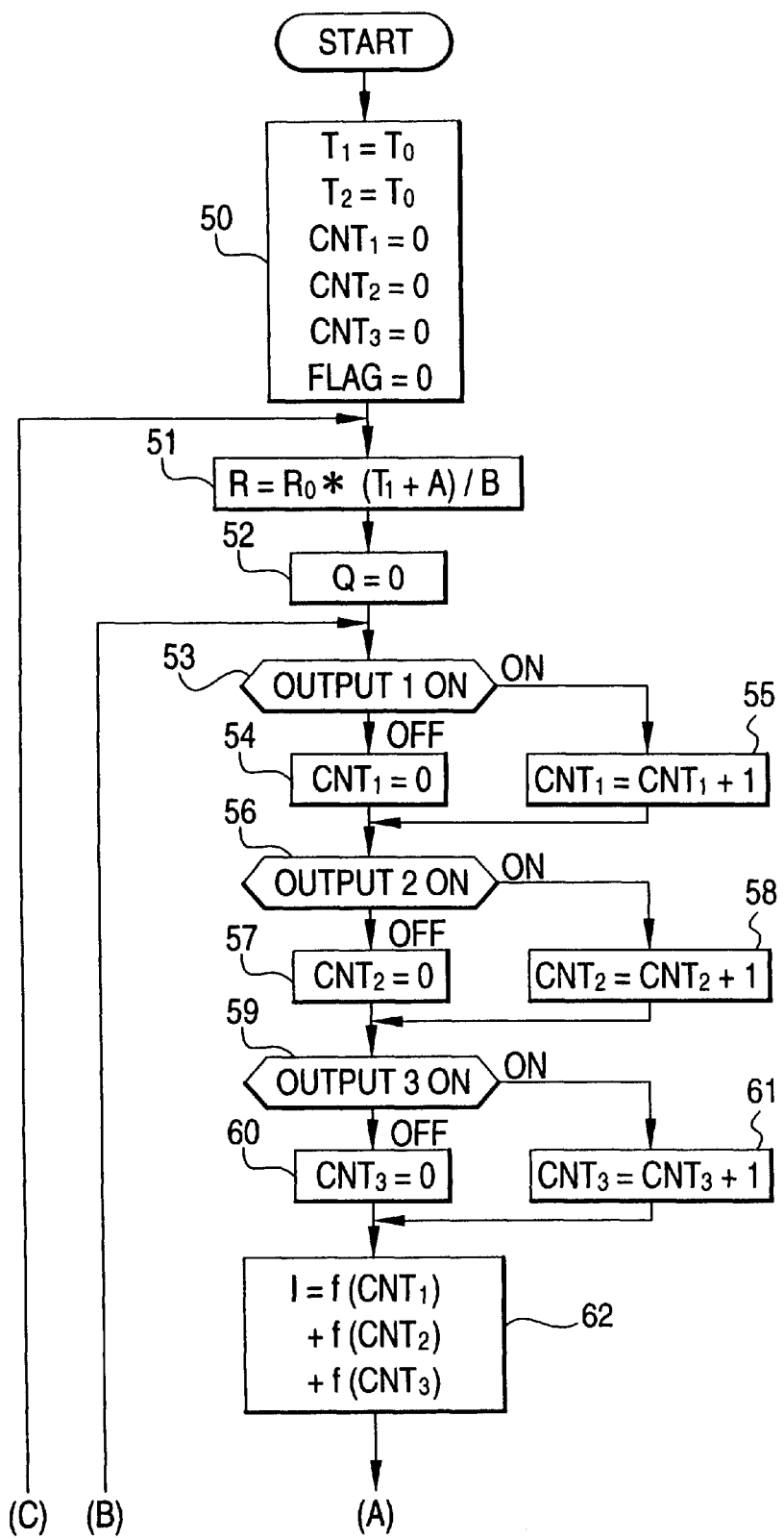
FIG. 3 is a flow chart showing the control operation of the cruise control apparatus of FIG. 1.
Figure 4:
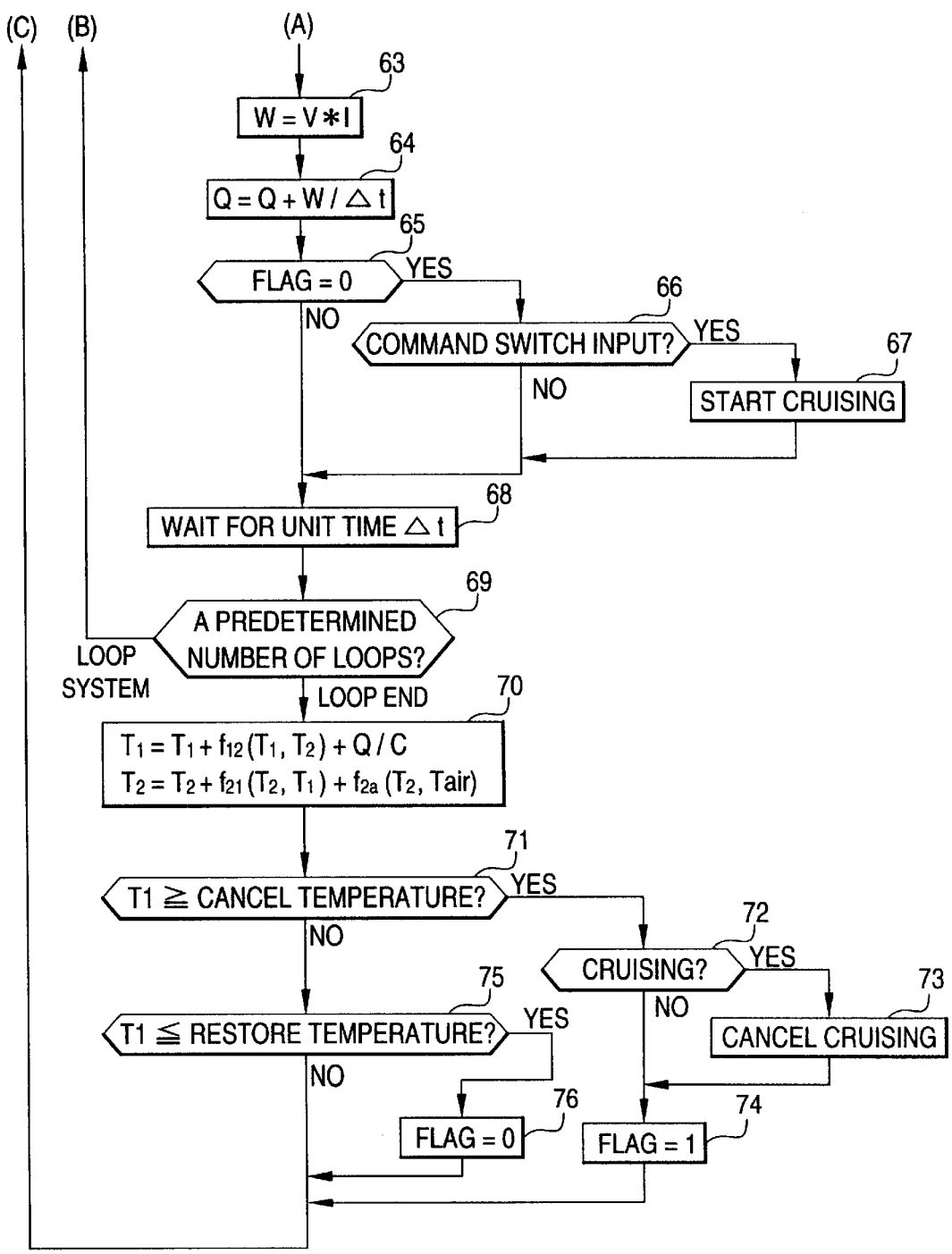
FIG. 4 is a flow chart showing the control operation of the cruise control apparatus of FIG. 1.

The cruise control apparatus 1 described above operates according to the flow chart shown in FIGS. 3 and 4. The flow chart does not show the main part of the cruise control but explains mainly the control operation of the temperature estimation unit 18, the temperature check unit 19 and the cancel unit 20.

First, in a step 50 an "initial value substitution" is executed and then the program moves to step 51. The substitution of the initial values involves setting T0 into the estimated coil temperatures T1, T0 into the estimated in-case temperatures T2, 0 into the counter value of the first counter CNT1, 0 into the counter value of the second counter CNT2, 0 into the counter value of the third counter CNT3, and resetting the cancel flag FLAG.

At step 51, the fourth procedure by the temperature estimation unit 18 is executed to calculate the resistances R of the first-, second- and third-phase stator coils 5$a$1, 5$a$2, 5$a$3 of the step motor 5$a$, before moving to the step 52.

At step 52, the fifth procedure by the temperature estimation unit 18 is executed to initialize the generated heat Q of the first-, second- and third-phase stator coils 5$a$1, 5$a$2, 5$a$3 of the step motor 5$a$, before moving to step 53.

At steps 53, 54 and 55, the sixth procedure by the temperature estimation unit 18 is executed to measure the time during which the first output signal is applied from the motor output unit 17 to the first-phase stator coil drive unit of the drive circuit 12, counting the time data of current application to the first-phase stator coil 5$a$1 of the step motor 5$a$ by the first counter CNT1. After this the processing moves to step 56. The first counter CNT1 is counted up in synchronism with the turn-on or turn-off of the first output signal.

Next, at steps 56, 57 and 58, a measurement is taken of the time during which the second output signal is applied from the motor output unit 17 to the second-phase stator coil drive unit of the drive circuit 12, counting the time data of current application to the second-phase stator coil 5$a$2 of the step motor 5$a$ by the second counter CNT2. After this the processing moves to step 59. The second counter CNT2 is counted up in synchronism with the turn-on or turn-off of the second output signal.

Next, at steps 59, 60 and 61, a measurement is taken of the time during which the third output signal is applied from the motor output unit 17 to the third-phase stator coil drive unit of the drive circuit 12, counting the time data of current application to the third-phase stator coil 5$a$3 of the step motor 5$a$ by the third counter CNT3. After this the processing moves to step 62. The third counter CNT3 is counted up in synchronism with the turn-on or turn-off of the third output signal.

At step 62, the seventh procedure by the temperature estimation unit 18 is executed to calculate the current value I as a function of the time data of current application to the first-, second- and third-phase stator coils 5$a$1, 5$a$2, 5$a$3 of the step motor 5$a$, the resistance value R determined by the fourth procedure and the supply voltage V shown in the third procedure. Then the program proceeds to step 63.

At step 63, the eighth procedure by the temperature estimation unit 18 is executed to calculate the power consumption W from the current value I determined by the seventh procedure and the supply voltage V determined by the third procedure. Then the processing moves to step 64.

At step 64, the ninth procedure by the temperature estimation unit 18 is executed to integrate the power consumption W determined by the eighth procedure to calculate the generated heat Q. Then the processing moves to step 65.

Step 65 checks whether the cancel flag FLAG for canceling the cruise control is set or not. Because the "cancel flag FLAG is not set," the process proceeds to step 66.

Step 66 checks the input state of the command switch 3. Because "there is an input from the command switch 3," the processing moves to step 67.

Step 67 executes the "cruise start" processing before moving to step 68. So, the clutch 5$b$ of the actuator 5 is engaged and the exciting currents are successively applied to the first-, second- and third-phase stator coils 5a1, 5a2, 5a3 to rotate the rotor 5f, at which time the cruise control is started for matching the actual car speed data supplied from the car speed sensor 2 with the memory car speed data of the car speed storage unit 15.

Step 68 executes the "wait until a predetermined time Δt (0.25 ms is used here) elapses" processing before moving to step 69.

Step 69 checks the number of loops. Until a predetermined number of loops (600 loops are used here) is finished, the program returns to step 53 and executes the step 53 to step 68 repetitively. Then, after the predetermined number of loops has been completed, the program moves to step 70.

Step 70 executes the tenth procedure by the temperature estimation unit 18 to calculate the estimated coil temperatures T1 (estimated in-case temperatures T2), before moving to step 71.

Step 71 performs the check processing by the temperature check unit 19 to see whether the estimated coil temperatures T1 calculated by step 70 exceed the first value (estimated in-case temperatures T2).

When the estimated coil temperatures T1 exceed the first value, the program moves to step 72. When the estimated coil temperatures T1 do not exceed the first value, the program moves to step 75.

Step 72 checks whether the cruise control is being performed or not. Because "the cruise control is under way," the program moves from step 72 to step 73. If the cruise control is not under way, the program moves from step 72 to step 74.

Step 73 is a control operation performed by the cancel unit 20 according to the result of decision made by the temperature check unit 19.

Step 73 executes the "cruise cancel" processing, after which the program moves to step 74 where it sets the cancel flag FLAG (FLAG=1). Then the program returns to step 51. Executing the "cruise cancel" processing causes the cancel command signal to be applied to the control unit 14.

Having received the cancel command signal, the control unit 14 cuts off the clutch output unit on-command signal, turning off the clutch drive unit of the drive circuit 12 to disengage the clutch 5b of the actuator 5. This in turn cuts off the motor output unit on-command signal, stopping the opening adjustment of the throttle valve 24 and canceling the cruise control.

Steps 51 through 64 are executed. Because step 65 determines that the "cancel flag FLAG is set," the steps 66 and 67 are skipped, so that the control unit 14 does not accept the input of the command switch 3. Then, steps 68 and 69 are executed to perform a predetermined number of loops to estimate temperatures by the temperature estimation unit 18. When the loops are finished, the program moves to step 70.

While the loop is repeated, when the estimated coil temperatures T1 become lower than the first value, the program moves from step 71 to step 75 where it causes the temperature check unit 19 to check whether the estimated coil temperatures T1 calculated by step 70 are below the second value.

When the estimated coil temperatures T1 are not below the second value, the program moves from step 75 to step 51 where it resumes the predetermined loop of temperature estimation by the temperature estimation unit 18.

When the estimated coil temperatures T1 are below the second value, the program moves from step 75 to step 76 where it "resets the cancel flag FLAG" before returning to step 51 where it resumes the predetermined loop of temperature estimation by the temperature estimation unit 18.

After the cancel flag FLAG is reset, the program moves from step 65, which is in a predetermined loop of temperature estimation by the temperature estimation unit 18, to step 66 where the input of the command switch 3 is accepted by the control unit 14, thus resuming the cruise control.

As described above, while the cruise control is performed, the temperature estimation unit 18 calculates the estimated coil temperatures T1 of the first-, second- and third-phase stator coils 5a1, 5a2, 5a3 of the step motor 5a. When the temperature check unit 19 has decided that the coil temperature data estimated by the temperature estimation unit 18 is in excess of the predetermined first value, the cancel unit 20 is turned on to disengage the clutch 5b of the actuator 5, stopping the opening adjustment of the throttle valve 24 and thereby canceling the cruise control. At the same time, the input of the command switch 3 is no longer accepted.

After the temperature check unit 19 has decided that the coil temperature data estimated by the temperature estimation unit 18 is in excess of the predetermined first value until it decides that the coil temperature data estimated by the temperature estimation unit 18 is below the predetermined second value, the cancel unit 20 is turned on to apply the cancel command signal to the control unit 14 to cancel the cruise control.

When the temperature check unit 19 decides that the coil temperature data estimated by the temperature estimation unit 18 is higher than the predetermined first value, the control unit 14 does not accept the input from the command switch 3. After the temperature check unit 19 has decided that the coil temperature data estimated by the temperature estimation unit 18 is in excess of the predetermined first value until it decides that the coil temperature data estimated by the temperature estimation unit 18 is below the predetermined second value, the control unit 14 does not accept the input from the command switch 3, with the result that the cruise control is not carried out.

Figure 5:
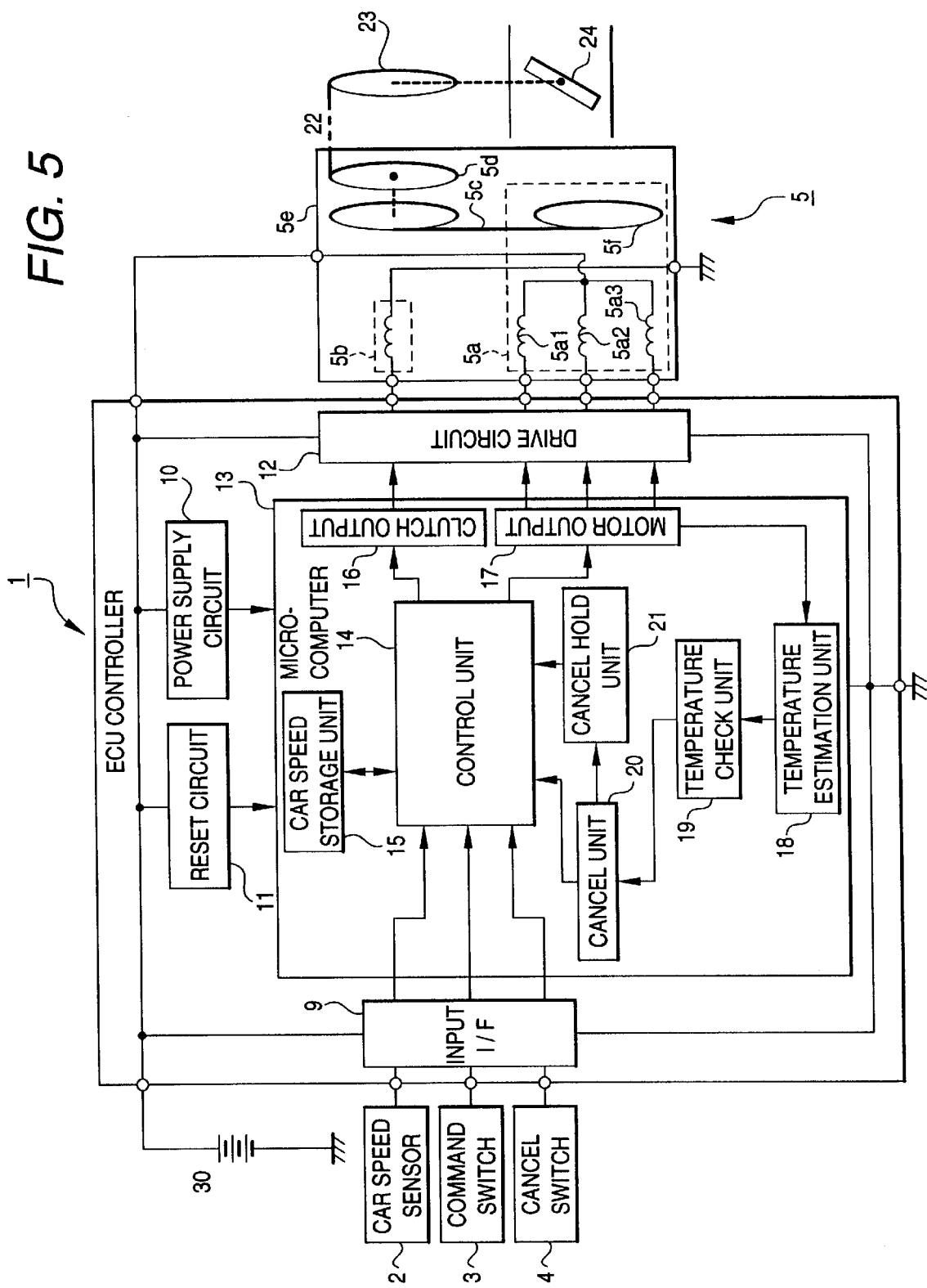
FIG. 5 is a block configuration diagram of the second embodiment of the cruise control apparatus according to the present invention.

FIG. 5 shows a second embodiment of the cruise control apparatus according to the present invention.

The microcomputer 13 in this case incorporates a cancel hold unit 21 in addition to the units of the first embodiment and other units of the second embodiment is the same of the first embodiment.

When the cancel unit 20 generates a first cancel command signal, a timer built into the cancel hold unit 21 is turned on and, for a predetermined time interval until the timer's time is up, the cancel hold unit 21 applies a second cancel command signal to the control unit 14.

Because the control unit 14 is given the second cancel command signal from the cancel hold unit 21 triggered by the first cancel command signal from the cancel unit 20, the clutch 5b of the actuator 5 remains turned off, the exciting currents that were supplied to the first-, second- and third-phase stator coils 5a1, 5a2, 5a3 are kept turned off and the cruise control remains canceled for a predetermined time interval until the time of the timer in the cancel hold unit 21 is up.

As described above, according to the cruise control apparatus in the first aspect of the invention, when the temperature data from the actuator temperature estimation means is in excess of the predetermined value, the controller cancels the cruise control. When the temperature of the actuator becomes high, the actuator can not use for the cruising control. This suppresses the actuator temperature rise. Preventing the temperature rise of the actuator can offer an excellent advantage of improving the reliability of the actuator.

According to the cruise control apparatus in the second aspect of the invention, when the temperature check means decides that the temperature data from the actuator temperature estimation means is in excess of the predetermined value, the cancel means applies a cancel command signal to the control unit to stop the cruising. When the temperature of the actuator becomes high, the cancel means cancels the cruising, stopping the operation of the actuator. This suppresses the actuator temperature rise. Preventing the temperature rise of the actuator can offer an excellent advantage of improving the reliability of the actuator.

According to the cruise control in the third aspect of the invention, when the temperature check means decides that the temperature data from the actuator temperature estimation means is in excess of the predetermined temperature data, the control unit does not accept the cruise command signal from the command switch. Because the input from the command switch is not accepted when the actuator temperature becomes high, the cruising is stopped and the actuator is not operated, thus limiting an actuator temperature rise. Preventing the temperature rise of the actuator can offer an excellent advantage of improving the reliability of the actuator.

According to the cruise control in the fourth aspect of the invention, when the temperature check means decides that the temperature data from the actuator temperature estimation means is in excess of the predetermined first value, the cancel means applies to the control unit a cancel command signal for stopping the cruising until the temperature data from the actuator temperature estimation means goes below the predetermined second value. Because the cruising is canceled by the cancel means until the actuator temperature goes below the predetermined temperature, the actuator temperature rise can be suppressed. Preventing the temperature rise of the actuator can offer an excellent advantage of improving the reliability of the actuator.

According to the cruise control apparatus in the firth aspect of the invention, when the temperature check means decides that the temperature data from the actuator temperature estimation means is in excess of the predetermined first value, the control unit does not accept the cruise command signal from the command switch until the temperature data from the actuator temperature estimation means goes below the predetermined second value. Because the command switch input is not accepted until the actuator temperature is below the predetermined temperature, the cruising is not performed and the actuator temperature rise can be suppressed. Preventing the temperature rise of the actuator can offer an excellent advantage of improving the reliability of the actuator.

According to the cruise control apparatus in the six aspect of the invention, when the temperature check means decides that the temperature data from the actuator temperature estimation means is in excess of the predetermined first value, the cancel means applies the cancel command signal to the control unit until the temperature data from the actuator temperature estimation means goes below the predetermined second value. When the temperature check means decides that the temperature data from the actuator temperature estimation means is in excess of the predetermined first value, the control unit does not accept the cruise command signal from the command switch until the temperature data from the actuator temperature estimation means goes below the predetermined second value. Because the cruising is canceled and the command switch is not accepted until the actuator temperature goes below the predetermined temperature, the cruising control is stopped and the actuator is not operated. This suppresses the actuator temperature rise. Preventing the temperature rise of the actuator can offer an excellent advantage of improving the reliability of the actuator.

According to the cruise control apparatus in the seventh aspect of the invention, when there is an output signal from the temperature check means, the cancel means applies to the control unit the first cancel command signal for stopping the cruising. When there is the first cancel command signal from the cancel means, the cancel hold means generates the second cancel command signal for a predetermined time interval. Because when the actuator temperature increases, the cruising is canceled by the cancel means and the cancel hold means, the cruising is stopped and the actuator is not operated. This suppresses the actuator temperature rise. Preventing the temperature rise of the actuator can offer an excellent advantage of improving the reliability of the actuator.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A cruise control apparatus comprising:
   an actuator to open and close a throttle valve;
   a controller to drive and control the actuator; and
   an actuator temperature estimation means to estimate an ambient temperature of the actuator based on a frequency of operation of the actuator;
   wherein the controller cancels a cruise control when temperature data given by the actuator temperature estimation means exceeds a predetermined value.

2. A cruise control apparatus comprising:
   a command switch operated to generate a cruise command signal for performing cruising;
   a controller having a control unit to give an actuator a drive signal for cruising at a constant speed upon receiving the cruise command signal generated by the command switch;
   an actuator to control the opening and closing of a throttle valve of an engine according to the drive signal from the controller;
   an actuator temperature estimation means to estimate an ambient temperature of the actuator based on a frequency of operation of the actuator;
   a temperature check means to check whether temperature data given by the actuator temperature estimation means is in excess of a predetermined value and, when it decides that the temperature data is in excess of the predetermined value, generate an output signal; and
   a cancel means to apply to the control unit a cancel command signal for stopping the cruising while it is supplied with the output signal from the temperature check means.

3. A cruise control apparatus comprising:
   a command switch operated to generate a cruise command signal for performing cruising;
   a controller having a control unit to give an actuator a drive signal for cruising at a constant speed upon receiving the cruise command signal generated by the command switch;
   an actuator to control the opening and closing of a throttle valve of an engine according to the drive signal from the controller;
   an actuator temperature estimation means to estimate an ambient temperature of the actuator based on a frequency of operation of the actuator; and a temperature check means to check whether temperature data given by the actuator temperature estimation means is in excess of a predetermined value and, when it decides that the temperature data is in excess of the predetermined value, generate an output signal;

wherein the control unit disables the acceptance of the cruise command signal from the command switch while the temperature check means is generating the output signal.

4. A cruise control apparatus comprising:

a command switch operated to generate a cruise command signal for performing cruising;

a controller having a control unit to give an actuator a drive signal for cruising at a constant speed upon receiving the cruise command signal generated by the command switch;

an actuator to control the opening and closing of a throttle valve of an engine according to the drive signal from the controller;

an actuator temperature estimation means to estimate an ambient temperature of the actuator based on a frequency of operation of the actuator;

a temperature check means to check whether temperature data given by the actuator temperature estimation means is in excess of a predetermined value and, when it decides that the temperature data from the actuator temperature estimation means is in excess of a first value, generate an output signal and continue to generate the output signal until the temperature data from the actuator temperature estimation means is below a predetermined second value, the second value being lower than the first value; and a cancel means to generate a cancel command signal for stopping the cruising while it is supplied with the output signal from the temperature check means.

5. A cruise control apparatus comprising:

a command switch operated to generate a cruise command signal for performing cruising;

a controller having a control unit to give an actuator a drive signal for cruising at a constant speed upon receiving the cruise command signal generated by the command switch;

an actuator to control the opening and closing of a throttle valve of an engine according to the drive signal from the controller;

an actuator temperature estimation means to estimate an ambient temperature of the actuator based on a frequency of operation of the actuator; and a temperature check means to check whether temperature data given by the actuator temperature estimation means is in excess of a predetermined value and, when it decides that the temperature data from the actuator temperature estimation means is in excess of a first value, generate an output signal and continue to hold the output signal until the temperature data from the actuator temperature estimation means is below a predetermined second value, the second value being lower than the first value;

wherein the control unit disables the acceptance of the cruise command signal from the command switch while the temperature check means is generating the output signal.

6. A cruise control apparatus comprising:

a command switch operated to generate a cruise command signal for performing cruising;

a controller having a control unit to give an actuator a drive signal for cruising at a constant speed upon receiving the cruise command signal generated by the command switch;

an actuator to control the opening and closing of a throttle valve of an engine according to the drive signal from the controller;

an actuator temperature estimation means to estimate an ambient temperature of the actuator based on a frequency of operation of the actuator; and a temperature check means to check whether temperature data given by the actuator temperature estimation means is in excess of a predetermined value; and a cancel means to generate an output signal when the temperature check means decides that the temperature data from the actuator temperature estimation means is in excess of a predetermined first value, and to apply a cancel command signal to the control unit while the cancel means is supplied with the output signal from the temperature check means until the temperature data from the actuator temperature estimation means is below a predetermined second value, the second value being lower than the first value;

wherein the control unit disables the acceptance of the cruise command signal from the command switch while the temperature check means is generating the output signal.

7. A cruise control apparatus comprising:

a command switch operated to generate a cruise command signal for performing cruising;

a controller having a control unit to give an actuator a drive signal for cruising at a constant speed upon receiving the cruise command signal generated by the command switch;

an actuator to control the opening and closing of a throttle valve of an engine according to the drive signal from the controller;

an actuator temperature estimation means to estimate an ambient temperature of the actuator based on a frequency of operation of the actuator;

a temperature check means to check whether temperature data given by the actuator temperature estimation means is in excess of a predetermined value and, when it decides that the temperature data from the actuator temperature estimation means is in excess of the predetermined value, generate an output signal;

a cancel means to apply to the control unit a first cancel command signal for stopping the cruising while it is supplied with the output signal from the temperature check means; and a cancel hold means to generate a second cancel command signal for a predetermined time interval when the cancel means generates the first cancel command signal.

* * * * *